(12) United States Patent
Dettinger et al.

(10) Patent No.: US 8,713,036 B2
(45) Date of Patent: Apr. 29, 2014

(54) PROCESSING ABSTRACT DERIVED ENTITIES DEFINED IN A DATA ABSTRACTION MODEL

(71) Applicant: International Business Machines Corporation, Armonk, NY (US)

(72) Inventors: Richard D. Dettinger, Rochester, MN (US); Richard J. Stevens, Monkton, VT (US); Jeffery W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/841,529

(22) Filed: Mar. 15, 2013

(65) Prior Publication Data
US 2013/0226901 A1    Aug. 29, 2013

Related U.S. Application Data

(63) Continuation of application No. 10/897,353, filed on Jul. 22, 2004, now abandoned.

(51) Int. Cl.
*G06F 17/30* (2006.01)
*G06F 15/16* (2006.01)

(52) U.S. Cl.
USPC ........................................ 707/759; 707/714

(58) Field of Classification Search
USPC ................................................. 707/759, 714
See application file for complete search history.

(56) References Cited

U.S. PATENT DOCUMENTS

| | | | |
|---|---|---|---|
| 5,734,887 A | 3/1998 | Kingberg et al. | |
| 6,725,227 B1 | 4/2004 | Li | |
| 7,003,730 B2 | 2/2006 | Dettinger et al. | |
| 2003/0172056 A1 | 9/2003 | Dettinger et al. | |
| 2005/0154765 A1 | 7/2005 | Seitz et al. | |
| 2006/0020582 A1 | 1/2006 | Dettinger et al. | |

*Primary Examiner* — Alex Gofman

(74) *Attorney, Agent, or Firm* — Patterson & Sheridan LLP

(57) ABSTRACT

Techniques involving an abstract derived entity. The abstract derived entity is a data object present in an abstract data model that may be referenced by other entities in the abstract data model as though it were a relational table present in a physical data source. The abstract data model provides data access independent of the manner in which the data is physically represented in a set of physical data sources. The abstract derived entity may be used to provide aggregate data joined with other non-aggregate data. The abstract derived entity may describe a relational table comprising a set of aggregate data used to form a column of the relational table joined to other columns formed from the sets of input data specified by the abstract derived entity. The resulting abstract derived table may be queried as though it were an actual relational table stored in a physical data source.

20 Claims, 12 Drawing Sheets

DRUGS                                   300

| Patient ID | Drug | Began | Stopped |
|---|---|---|---|
| 4002 | Alendronate sodium | 3/7/1995 | 6/12/2003 |
| 5001 | Etoricoxib | 11/1/1999 | 01/01/2004 |
| ... | | | |
| 5001 | MK-767 | 07/12/1985 | 11/10/2003 |

310 ↙

DEMOGRAPHICS        320 ↙

| Patient ID | Name | City | State |
|---|---|---|---|
| 4002 | John Smith | Rochester | NM |
| ... | | | |
| 5001 | Peter Jones | Milwaukee | WI |

LAB TESTS        330 ↙

| Patient ID | Glucose | Test Date |
|---|---|---|
| 4002 | 15 | 03/07/1995 |
| 4002 | 16 | 03/01/1996 |
| 4002 | 15 | 03/01/1997 |
| 5001 | 16 | 11/01/1999 |
| 5001 | 20 | 11/07/2000 |
| 5001 | 25 | 11/03/2001 |
| 5001 | 30 | 11/10/2002 |
| ... | | |
| 5001 | 33 | 11/10/2003 |

*FIG. 3*

SEARCH CONDITIONS

| ACTION | AND/OR | NOT | CONDITION |
|---|---|---|---|
| EDIT | | ☐ | DRUG NAME = "MK-767" |
| EDIT | AND ▶ | ☐ | EVENT PROFILE: (GLUCOSE TREND > 0) |

[ ADD CONDITION ] [ ADD EVENT PROFILE ] [ SAVE ] [ OPEN ]

CURRENT SEARCH SUMMARY ((DRUG NAME = MK-767) AND
(EVENT PROFILE) (GLUCOSE TREND > 0)))

[ EXECUTE ]—906    [ SAVE ]    [ CANCEL ]    [ OPTIONS ]

*FIG. 9*

QUERY CONDITIONS

FOR GLUCOSE TREND DATA SPECIFY

LOCATION

STATE :

ANY
ALABAMA
ALASKA
ARIZONA
ARKANSAS

GENDER
○ MALE
○ FEMALE
○ EITHER

PROCESSING ABSTRACT DERIVED ENTITIES DEFINED IN A DATA ABSTRACTION MODEL

CROSS-REFERENCE TO RELATED APPLICATIONS

This application is a continuation of co-pending U.S. patent application Ser. No. 10/897,353, filed Jul. 22, 2004. The aforementioned related patent application is herein incorporated by reference in its entirety.

BACKGROUND

The present invention generally relates to data processing and more particularly to a system and method for performing complex data queries.

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. Regardless of the particular architecture, in a DBMS, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). SQL is a standardized language for manipulating data in a relational database.

Illustratively, SQL is used to compose queries that retrieve information from a database and to update information in a database. Commercial databases include products such as International Business Machines' (IBM) DB2, Microsoft's SQL Server, and database products from Oracle, Sybase, and Computer Associates. The term "query" denotes a set of commands used to retrieve or update data by specifying columns, tables and the various relationships between them relevant to the query. Queries take the form of a command language allowing programmers and application programs to select, insert, update, add, modify, and locate data in a relational database.

One issue faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each relational schema. Yet another difficulty is evolution of the application to work with alternate data representations because SQL is designed for use with relational systems. Extending the application to support alternative data representations, such as XML, requires rewriting the application's data management layer to use additional data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the case of EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application build and deployment cycle to react to reorganization of the underlying physical data model or to support alternative data representations. EJB programming also requires specialized skills; since more advanced Java programming techniques are involved. Accordingly, the EJB approach and other similar approaches are both inflexible and costly to maintain for general-purpose query applications that access an evolving physical data model.

Another approach used to address the foregoing problems is creating a data abstraction layer. A data abstraction layer sits between an application and the underlying physical data. The data abstraction layer defines a collection of logical fields that are loosely coupled to the underlying physical mechanisms storing the data. The logical fields are available to compose queries to search, retrieve, add, and modify data stored in the underlying database.

One difficulty encountered constructing an abstraction layer is representing data derived from multiple rows of data stored in an SQL table (i.e., columnar data). An aggregate data value is calculated from the rows of a query result (or a grouping of these rows). For example, an aggregate may be calculated from multiple rows returned by a query such as an average, a sum, or a slope (used to detect trends within data).

One approach to solve this limitation is to have a database administrator create individual SQL views that perform aggregation calculations and then specify these as a data source that the abstract model may query and join with other results. This solution, however, requires that a database administrator become involved in the creation of these views, and thus can become a bottleneck in having queries created. Also, because a static view performs the aggregation function, a database administrator must create a static view for each different aggregation. Stated another way, users cannot dynamically change the rows included in the aggregation. For example, one static view may provide an aggregate value defined by the average age of adult males living in a particular city. If a user wanted to perform a similar query substituting females, a new static view would have to be created. Finally, as the underlying data sources change, particularly in a distributed environment, statically created views may reference underlying data that is no longer available to respond to query request.

Accordingly, it would be useful to view aggregate values for related groupings of rows joined to non-aggregate data without the requirement of maintaining a static view for each aggregation. Further, it would be useful to allow users to apply conditions that restrict the rows included in a particular aggregation (e.g., only include columnar data in an aggregation when a contemporaneous condition is true). Also, users should be able to apply conditions to the results generated for an aggregation (e.g., return only results where an aggregate value from a group of aggregate values crosses a dynamically selected threshold value).

SUMMARY

The present invention generally provides systems and methods to define, construct and query data using abstract derived entities and using aggregate access methods that generate aggregate data values from data stored in an underlying physical data source. One embodiment of the present invention provides a method for processing a data access request. The method generally includes providing a data abstraction layer comprising a set of logical fields used to compose an abstract query, wherein each logical field provides an access method specifying at least a method for accessing a physical data source associated with the logical field, and wherein the physical data source for at least one access method comprises an abstract derived entity. The method generally further includes receiving, from a requesting entity, an abstract query wherein at least one logical field included in the abstract query specifies an access method referencing an abstract derived entity, retrieving a definition for the abstract derived entity referenced by the at least one logical field, and generating a derived table sub-query corresponding to the abstract derived entity.

Another embodiment of the invention provides a system for translating an abstract query into a query executable by a database management system. The system generally includes an abstract data layer, configured to include a plurality of logical fields used to compose an abstract query; wherein each logical field identifies an access method that specifies at least a method for accessing data associated with the logical field, and wherein at least one logical references an abstract derived entity as the data source associated with the at least one logical field. The system further includes a runtime component configured to receive an abstract query and (ii) to generate a query contribution for each logical field included in the abstract query, (ii) to build a derived table sub-query for the at least one logical field, (iii) to merge the query contributions and derived table sub-query into a combined query executable by the database management system, and (iv) to issue the combined query to the database management system and return the query results to the completed query results.

Another embodiment of the invention provides a computer readable medium containing a program which performs operations of generating a derived table for an abstract query defined by one or more logical fields, the operation comprising. The operations generally include, receiving, from a requesting entity, an abstract query wherein at least one logical field included in the abstract query specifies an access method referencing an abstract derived entity and retrieving a definition for the abstract derived entity referenced by the at least one logical field. The operations generally further include, generating a derived table sub-query corresponding to the abstract derived entity receiving, from a requesting entity, an abstract query wherein at least one logical field included in the abstract query specifies an access method referencing an abstract derived entity, retrieving a definition for the abstract derived entity referenced by the at least one logical field, and generating a derived table sub-query corresponding to the abstract derived entity.

Another embodiment of the invention provides a computer-readable medium, comprising information stored thereon. The information generally comprises an abstract data layer comprising a plurality of logical fields for composing abstract queries that access data stored in a data source, and at least one abstract derived entity defining sets of data wherein the sets are generated from the data stored in the data source, and a composition rule defining how to join the sets of table together to form a derived table. The information generally further includes a runtime component configured to perform an operation in response to receiving an abstract query issued against the data stored in the data source and data in the derived table.

Another embodiment of the invention provides a system for translating an abstract query into a query executable by a database management system. The system generally includes an abstract derived entity that comprises a data object defined in an abstract data model that may be referenced by other data objects included in the abstract data model as a relational table, wherein the columns of the relational table are composed from sets of data elements stored in physical data sources accessible by the system joined to one another in the relational table according to a composition rule defined for the abstract derived entity. The system generally further includes a set of logical fields that define a method for accessing data from a physical data source or from the relational table defined by the abstract derived entity. The system generally further includes a runtime component configured to process abstract query by transforming each logical field included in the abstract query into a query contribution used to retrieve data from the data source specified by the access method for the particular logical field, access data from the relational table and physical data sources according to the query contributions and to merge the data accessed from the relational table with the data retrieved from the physical data sources.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is illustrates three exemplary relational database tables manipulated by embodiments of the present invention.

FIGS. 9-10 illustrate exemplary graphical user interface screens from which a user may construct the abstract query described in FIG. 2C processed according to one embodiment of the invention.

DETAILED DESCRIPTION

Figure 1:
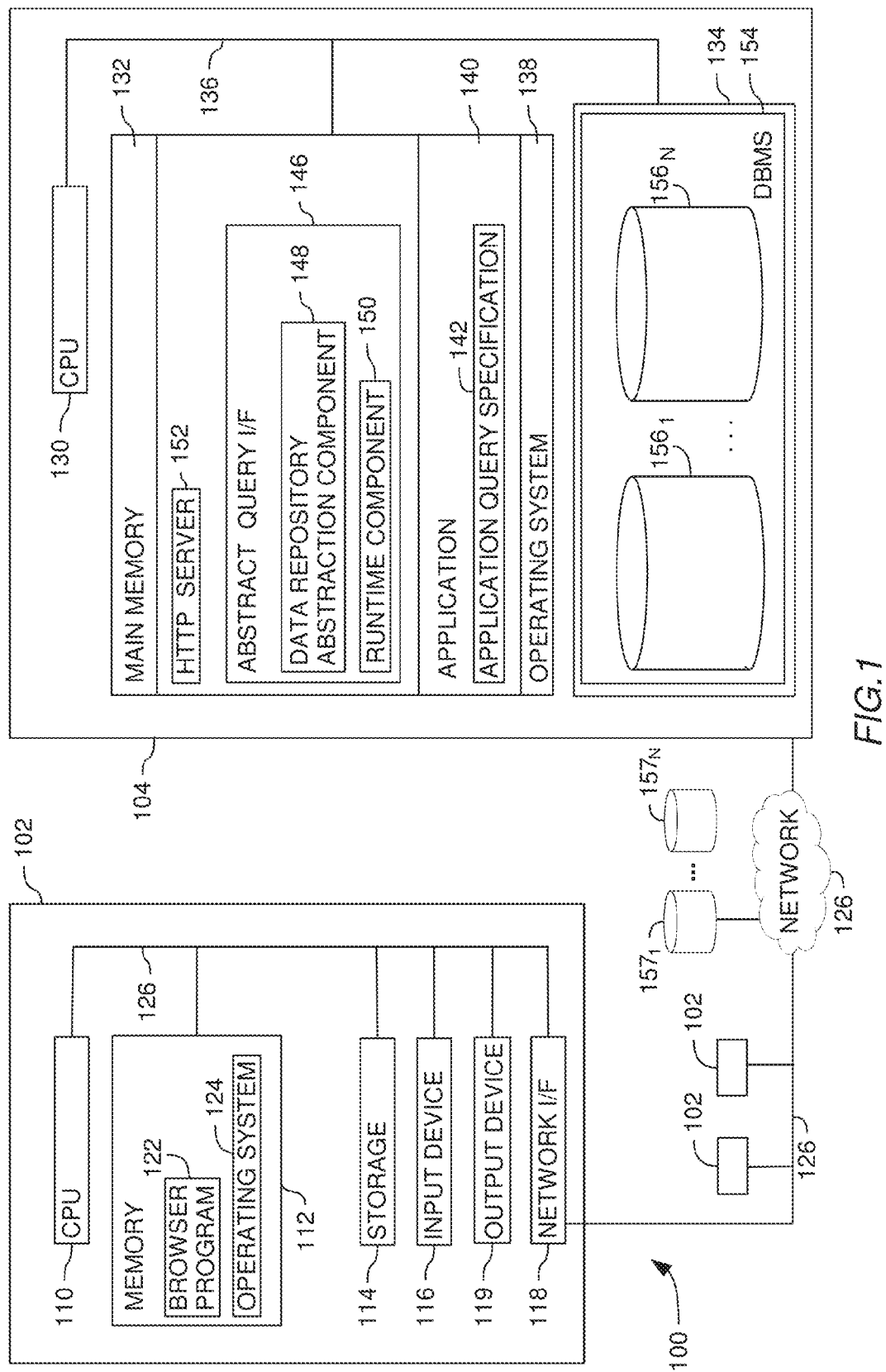
FIG. 1 is a computer system illustratively used, according to one embodiment of the intention.

In one embodiment, the present invention provides a data abstraction layer defined by a data abstraction model. One embodiment of a data abstraction model defines fields (sometimes referred to herein as logical fields) and access methods that map the fields to an underlying physical data source. The logical fields present a user with an intuitive representation of data objects stored in a physical data source. This simplified interface allows users to compose queries (based on conditions, patterns, and other pram raters) without having to understand the underlying physical structure. Each logical field may specify an access method to map from the logical view presented to the user and the data as stored in an underlying physical data source. Accordingly, logical fields may map to SQL tables (or other underlying physical data stores) via an access method. In one embodiment, access methods may describe the actual mapping to a table as either a simple, filtered, or composed mapping.

Embodiments of the present invention may also provide an aggregate access method defining an expression that evaluates an aggregate value (e.g., a sum, average, minimum, maximum, and the like) calculated from the underlying data source. For example, an average blood pressure logical field might reference an aggregate access method that returns an average blood pressure aggregate value calculated from a relational database column storing multiple blood pressure readings. An aggregate access method may also return multiple aggregate values (e.g., the average blood pressure of many patients) and provide a grouping of non-aggregate data (e.g., by patient name) to join with the multiple aggregate values.

Embodiments of the present invention may further provide an abstract derived entity (sometimes referenced by the acronym ADE). An ADE is a data object present in the data abstraction layer that is referenced by an access method as though it were a table. Rather than mapping to a physical database object or static SQL view, however, the ADE is defined in the data abstraction layer in terms of other entities, including other ADEs, tables, and any conditions or aggregates on named attributes (i.e., columns) of those entities. When a query specifies a selection or a result for a field defined over an ADE, the ADE is converted to a derived table at the time the abstract query is converted to an SQL query. The derived table may then be joined with other tables referenced in the SQL query.

In one embodiment of the present invention, query conditions may be qualified with one or more event profiles. An event profile is a persistent entity within the data abstraction model which may include one or more selection conditions and one or more logical connectors (e.g., AND, OR, XOR, etc). Binding the event profile to other conditions characterizes that portion of the query as event-based. Event-based queries are queries that associate search criteria with an event defined by other search criteria. As used herein, an event profile is an entity that is bound to a logical condition (e.g., ((AGE >30) AND (AGE <40))) and restricts the results that are returned in response to a query to only those that satisfy both the search criteria and the event profile. Stated differently, the event profile is only applied when the condition occurred (also referred to the "event" in this context). Logically, one may view an event profile as connected to the condition/event by a WHEN clause. The following is an example of an event-based search expression:

FIND all customers who lived in Minnesota WHEN they were between the ages of 30 and 40 years.

In this example, the "event" is living in Minnesota. Thus, the selection condition "between the ages of 30 and 40 years" is only applied for the time during which customers lived in Minnesota. Event profiles are described in detail in the commonly owned, co-pending U.S. patent application Ser. No. 10/094,531, entitled "Graphical User Interface To Build Event-Based Dynamic Searches Or Queries Using Event Profiles", filed Mar. 8, 2002, which is incorporated by reference in its entirety.

Note, however, that the event qualified by an event profile need not to correspond directly to time. An event may also be defined by a range of a parameter. An event profile may then be bound (i.e., applied) to the range such that only those results are returned which also fall within the range boundaries defined by the event profile.

One embodiment of the invention is implemented as a program product for use with a computer system such as, for example, the one illustrated in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. It should be appreciated, however, that any particular program nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card.

Storage 114 is preferably a direct access storage device. Although shown as a single unit, it may be a combination of fixed and/or removable storage devices, such as fixed disc drives, floppy disc drives, tape drives, removable memory cards, or optical storage. The memory 112 and storage 114 may be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

The memory 112 contains an operating system 124. Illustrative operating systems, which may be used to advantage, include Linux® and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative against which queries may be issued include local databases $156_1$ . . . $156_N$, and remote databases $157_1$ . . . $157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which transforms the abstract queries into a form consistent with the physical representation of the data contained in one or more of the databases 156-157. The application query specification 142 and the abstract query interface 146 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 152 may respond to requests to access a database(s) 156, which illustratively resides on the server 104. Incoming client requests for data from a database 156-157 invoke an application 140. When executed by the processor 130, the application 140 causes the server computer 104 to perform the steps or elements embodying the various aspects of the invention, including accessing the database(s) 156-157. In one embodiment, the application 140 comprises a plurality of software components configured to generate GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 152 shown in FIG. 1 is merely illustrative and other embodiments adapted to support any known and unknown protocols are contemplated.

Logical/Runtime View of Environment

Figure 2A:
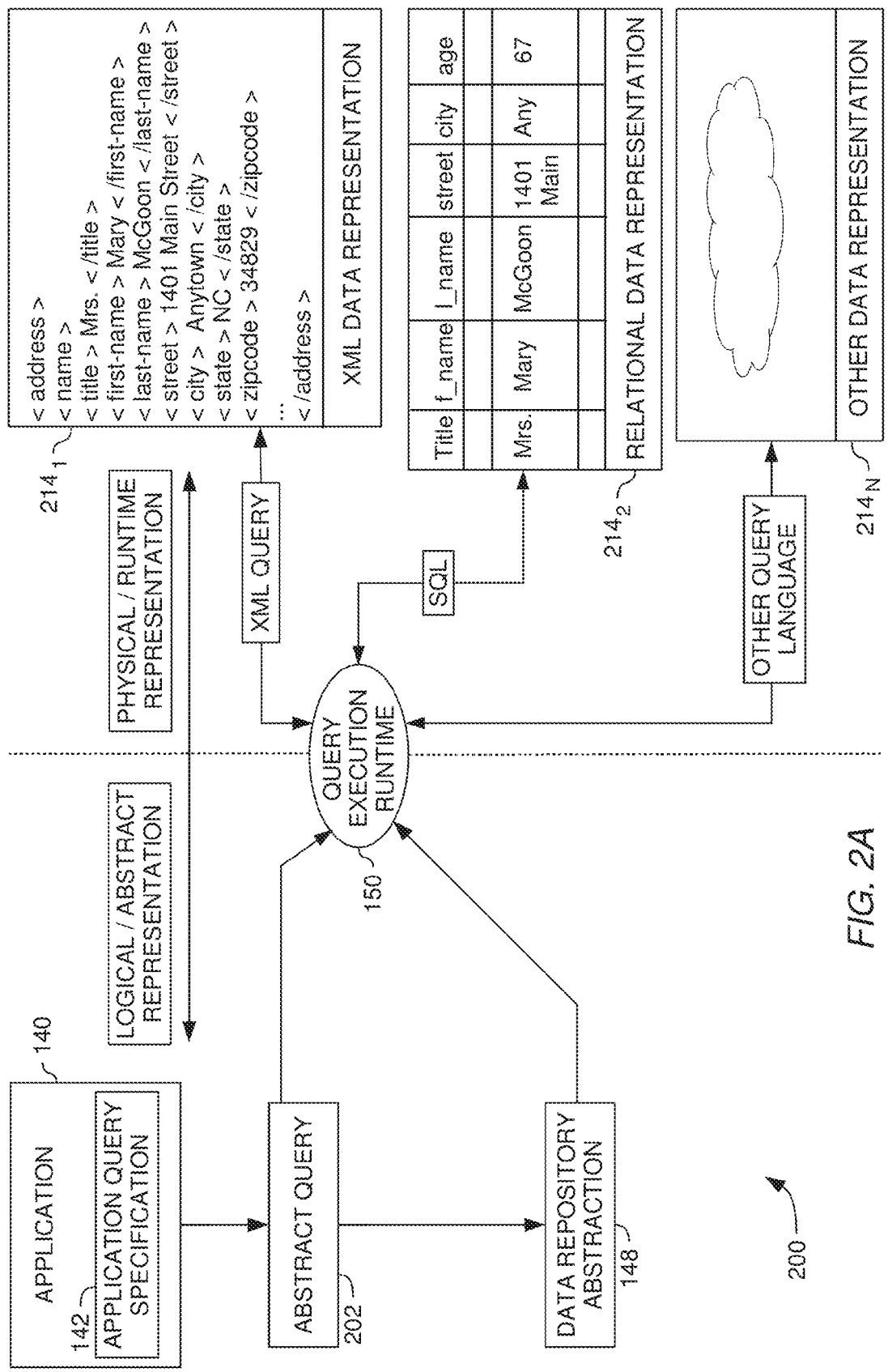
FIG. 2A is an illustrative relational view of software components.
Figure 2B:
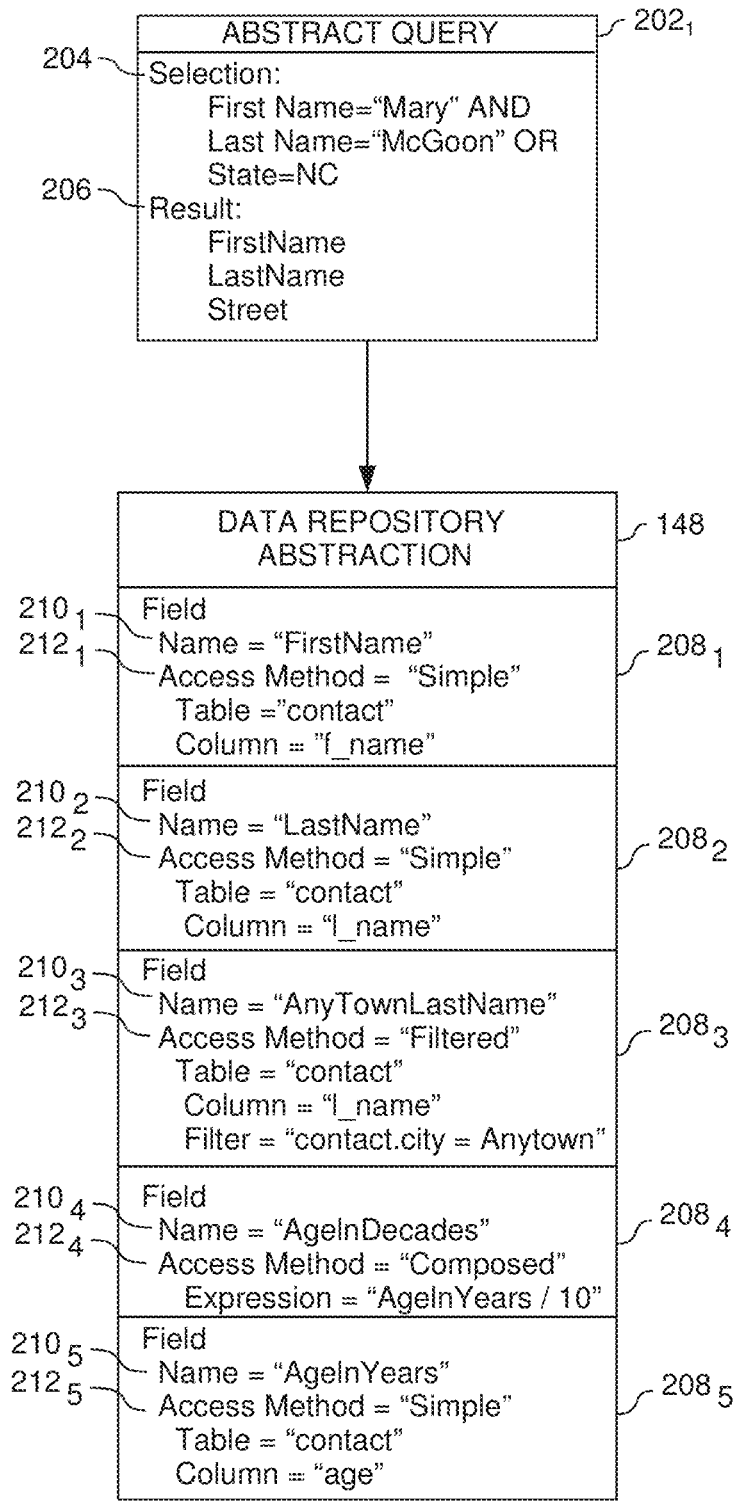
FIG. 2B is one embodiment of an abstract query and a data repository abstraction for accessing relational data.

FIGS. 2A-B show a plurality of interrelated components according to one embodiment of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156-157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query $202_1$ are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156-157, thereby allowing queries to be formed that are loosely coupled to the underlying data representation.

In general, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $2142$, $212_3$, $212_4$, $212_5$ (collectively, access method 212). The access methods associate (i.e., map) the logical field names to a particular physical data representation $214_1$, $214_2$ ... $214_N$ in a database (e.g., one of the databases 156). By way of illustration, two data representations are shown, an XML data representation $214_1$ and a relational data representation $214_2$. The physical data representation $214_N$ indicates that any other data representation, known or unknown, is contemplated.

Any number of access methods are contemplated depending upon the number of different types of logical fields to be supported. In one embodiment, access methods for simple fields, filtered fields, composed fields, and aggregate fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column) By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown.

Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields by using an expression that is supplied as part of the access method definition. In this way, information which does not exist in the underlying data representation may be computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate. In addition to simple, filtered and composed access methods, an aggregate access method may be used to calculate an aggregate value. Aggregate access methods are described below in conjunction with FIG. 2C.

Note, however, that the data repository abstraction component 148 shown in FIG. 2B is merely illustrative of selected logical field specifications and is not intended to be comprehensive. As such, the abstract query $202_1$ shown in FIG. 2B includes some logical fields for which specifications are not shown in the data repository abstraction component 148, such as "State" and "Street".

It is contemplated that the formats of the underlying data, e.g., dates, decimal numbers, currency, and the like, may vary. Accordingly, in one embodiment, the field specifications 208 include a type attribute reflecting the format of the underlying data. In another embodiment, however, the data format of the field specifications 208 is different from the associated underlying physical data, in which case an access method is responsible for returning data in the proper format assumed by the requesting entity. Thus, the access method needs to know what format of data is assumed (i.e., according to the logical field) as well as the actual format of the underlying physical data. With this information, the access method can then convert the underlying physical data into the format expected by the logical field.

By way of example, field specifications 208 of the data repository abstraction component 148 shown in FIG. 2B are representative of logical fields mapped to data represented in the relational data representation $214_2$. However, other instances of the data repository abstraction component 148 map logical fields to other physical data representations, such as XML. Further, in one embodiment, a data repository abstraction component 148 is configured with access methods for procedural data representations, i.e., an access method may invoke a remote procedure call requesting web services that returns the data requested by the call. Additionally, as further described below, an aggregate access method may map logical fields to aggregate values derived from the columns of a table or from an abstract derived entity.

An illustrative abstract query corresponding to the abstract query $202_1$ shown in FIG. 2 is shown in Table I below. By way of illustration, the data repository abstraction 148 is defined using XML. Other languages, however, may be used to advantage.

TABLE I

QUERY EXAMPLE

```
001    <?xml version="1.0"?>
002    <!--Query string representation: (FirstName = "Mary" AND LastName =
003    "McGoon") OR State = "NC"-->
004    <QueryAbstraction>
005        <Selection>
006            <Condition internalID="4">
007                <Condition field="FirstName" operator="EQ" value="Mary"
008    internalID="1"/>
009                <Condition field="LastName" operator="EQ" value="McGoon"
010    internalID="3" relOperator="AND"></Condition>
011            </Condition>
012            <Condition field="State" operator="EQ" value="NC" internalID="2"
013    relOperator="OR"></Condition>
014        </Selection>
015        <Results>
016                <Field name="FirstName"/>
017                <Field name="LastName"/>
018                <Field name="State"/>
019        </Results>
020    </QueryAbstraction>
```

Illustratively, the abstract query shown in Table I includes a selection specification (lines 005-014) containing selection criteria and a results specification (lines 015-019). In one embodiment, each selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. Other languages, however, may be used to advantage.

TABLE II

DATA REPOSITORY ABSTRACTION EXAMPLE

```
001    <?xml version="1.0"?>
002    <DataRepository>
003        <Category name="Demographic">
004            <Field queryable="Yes" name="FirstName" displayable="Yes">
005                <AccessMethod>
006                    <Simple columnName="f_name" tableName="contact"></Simple>
007                </AccessMethod>
008                <Type baseType="char"></Type>
009            </Field>
010            <Field queryable="Yes" name="LastName" displayable="Yes">
011                <AccessMethod>
012                    <Simple columnName="l_name" tableName="contact"></Simple>
013                </AccessMethod>
014                <Type baseType="char"></Type>
015            </Field>
016            <Field queryable="Yes" name="State" displayable="Yes">
017                <AccessMethod>
018                    <Simple columnName="state" tableName="contact"></Simple>
019                </AccessMethod>
020                <Type baseType="char"></Type>
021            </Field>
022        </Category>
023    </DataRepository>
```

FIG. 3 illustrates three relational databases used herein to describe abstract derived entities and aggregate access methods, according to one embodiment of the invention. The tables in FIG. 3 are provided to facilitate an understanding of embodiments of the invention. As illustrated, tables 300 include a drugs table 310, a demographics table 320 and a lab tests table 330. Each of the tables 300 share a Patient ID column (namely, 312, 322 and 332). The Lab Tests table includes a glucose column 334 that stores the value of a glucose test given to a patient and a test date column 336 storing the date the test was administered. The drugs table 310 also includes columns indicating when a patient began (column 314) and stopped (column 316) taking a particular drug. The demographics table 320 includes columns to store demographic information related to an individual patient.

In describing abstract derived entities and aggregate access methods, use is made of the data illustrated by relational tables 300. The medical nature of this data appearing in tables 300 is meant to be illustrative and is used to describe components and methods of the present invention. Accordingly, the tables illustrated in FIG. 3 do not exclude embodiments of the present invention implemented to process non-medical data or otherwise limit the present invention.

Figure 2C:
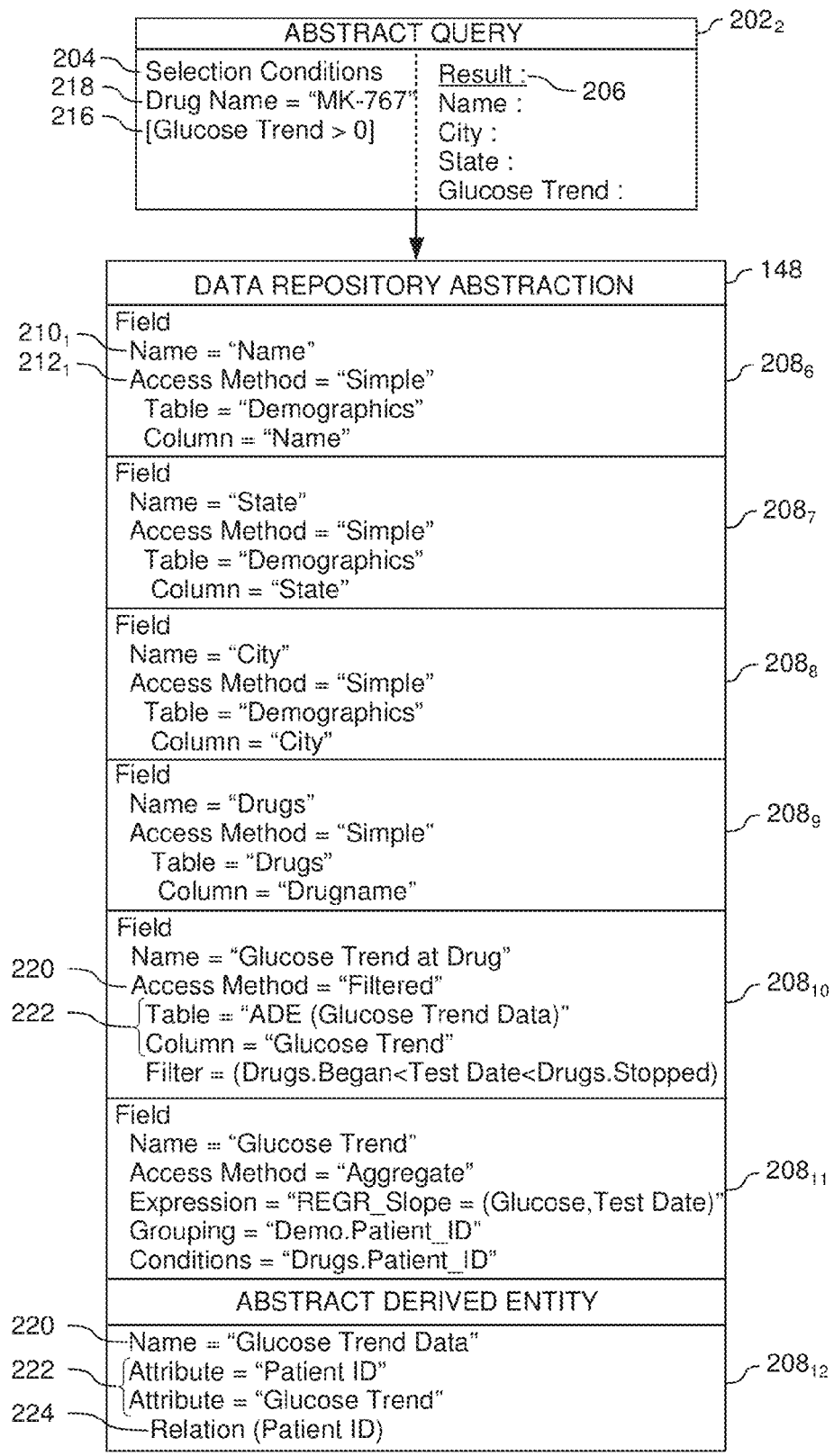
FIG. 2C illustrates another embodiment of an abstract query and a data repository abstraction for accessing relational data.

FIG. 2C illustrates a second abstract query $202_2$ and further illustrates an embodiment of data repository abstraction component 148. By way of example, abstract query $202_2$, includes the selection criterion 204 of "Drug Name"="MK-767" and event profile 216 of [Glucose Trend >0]. Event profile 216 is applied to the "Drugs" logical field and limits the results returned by the query to individuals whose glucose levels showed a rising trend when taking the drug named in the abstract query. Thus, the abstract query $202_2$ returns demographic information for patients exhibiting a rising glucose level while they were taking the drug MK-767. Specifically, result fields 206 include Name, City, State, and glucose trend fields.

Additional field specifications $208_{6-11}$ illustrate access methods mapping the logical fields of abstract query $202_2$ to an underlying physical representation (i.e., tables 300) or to abstract derived entities (e.g., the ADE illustrated in field specification $208_{12}$) defined in the data repository abstraction component 148. Similar to field specifications $208_1$, $208_2$ and $208_5$, from FIG. 2B, field specifications $208_{6-8}$ illustrate simple access methods that map the logical fields from the abstract query $202_2$ directly to the underlying data stored in tables 300. Field specification $208_9$ also maps to the underlying data using a simple access method. When composing a query that includes this logical field, a user may apply an event profile such as "(glucose trend >0)" to limit the rows returned from the "Drugs" table (310 from FIG. 3) to those where the condition specified by the event profile is true.

Field specification $208_{11}$ is an example of a logical field that maps to data using an aggregate access method. The logical field "glucose trend" maps to an aggregate value calculated from the "glucose" and "testdate" columns of the Lab Tests table 330. As described above, aggregate access methods return an aggregate value calculated from the row values of a relational table. An aggregate access method includes an expression for used to calculate the aggregate value returned by the logical field. Illustratively, field specification $208_{11}$ includes the expression "REGR_SLOPE (glucose, testdate)." The parameters included with the expression are the named columns of a physical table (or an ADE derived table) used to calculate the aggregate value. In this example, the expression uses parameters taken from the Lab Tests table 330. In addition to the expression, an aggregate access method may provide grouping conditions used to join aggregate values to non aggregate data. As illustrated, field specification $208_{11}$ includes the grouping condition of "patient ID." Thus, an aggregate value is calculated from the rows of the Lab Tests tab 330 for each patient ID.

The grouping condition may link to other data available to the data abstraction layer. For example, a grouping expression of "gender" found by joining the patient ID column of the Lab Tests table 330 with the Demographics table 320 would create two groups of data used to calculate two aggregate values; namely, one aggregate value for men and another for women. If no grouping conditions are specified, then all of the data appearing in the expression is used to calculate a single aggregate value. For example, by removing the grouping element from field specification $208_{11}$, then the expression, "REGR_SLOPE (labtests, glucose, labtests. testdate)", returns the regression slope calculated from all values in the glucose column of lab results table 330, regardless of the patient involved.

The aggregate access method illustrated in $208_{11}$ determines a glucose trend from the slope of the line generated from a regression function applied to a set of data points. Each data point provided to the regression function is composed as (Test Date, Glucose Level)). A user may then include this logical field in an event profile such as "(glucose trend >0)." Applying this event profile to other conditions in an abstract query may be used to uncover trends from the underlying data. A positive value for a glucose trend indicates that glucose levels are rising. When this event profile is applied to a condition such as "Drugs Taken=MK-767" the effect is to identify patients whose glucose levels exhibited a rising trend when the patient was taking drug MK-767.

Illustratively, the abstract derived entity $208_{12}$ defines a derived table containing rows with the columns Glucose trend aggregate value (i.e., the regression slope) and a corresponding patient ID. Although the ADE derived table is generated during query execution time, it may be referenced by logical fields in the data repository abstraction component 148, as though it were a physical data source. Further, because the ADE is generated at query execution, the data used to compose the ADE may very depending on the conditions present in an abstract query.

By combining logical fields that use aggregate access methods with an ADE, users may create complex queries that examine or discover trends in existing data. The abstract derived entity is used to dynamically generate a derived table during query execution that does not exist in the underlying physical data sources. An aggregate access method may be used to generate aggregate values from a set of data that is joined with other data values retrieved from the underlying physical data sources. The combined data is stored by the ADE table and may be referenced by other logical fields just like any other physical data source. Doing so allows users to construct abstract queries that alter the data used in the aggregation calculation based on, for example, the filtering expression of a filtered field. Aggregate values stored in an ADE may also be used as a condition criterion for selection fields in the manner described above.

For example, a "glucose trend" field may appear in the list of fields a user may add to a query output or use in query conditions. Combing a patient's glucose trend value with other conditions, e.g., the test subject was taking a particular test medication or the test subject was over a particular age, may reveal correlations that are not readily apparent from the test data alone.

Using the "glucose trend" illustration, an example of a data repository abstraction layer that includes an aggregate access method and ADE is now described. The Field specification $208_{10}$ illustrated in FIG. 2C depicts a "glucose trend at drug" field. The "glucose trend at drug" field references a filtered access method that adds a filter to retrieve glucose trend data only for the time that the patient was taking the specified drug. Similar to the filtered field $208_3$, field $208_{10}$ identifies a table and column mapped to by the field. The table and column referenced by logical field $208_{10}$, however, is the abstract derived entity "glucose trend data." The derived table generated by this abstract derived entity comprises aggregate values (e.g., glucose trend) for each patient with glucose test data within the time limitations of the filtering expression. The "glucose trend at drug" field $208_{10}$ is used as an attribute of the event profile "(glucose trend >0)" applied to the drug field $208_9$. Illustratively, the example of a data repository abstraction component set forth in Table II may be extended to include field specification $208_{10}$.

to generate a derived table within the data abstraction model at the time the abstract query is converted to a physical query of the underlying storage mechanisms. The abstract derived entity itself references other entities appearing in the data abstraction layer or fields appearing in the data repository abstraction component. Thus, an abstract derived entity may be used to generate new combinations of data previously unavailable to the abstract data model and store them in the derived table.

Abstract derived entity (ADE) $208_{12}$ includes the name attribute "glucose trend data." The ADE name element 220 may be referenced by field specifications 208 in the data repository abstraction component 148 (e.g., field specification $208_{10}$) and by other ADE's. In addition to the name element 220, an ADE is specified by a set of attributes 222 and relations 224. The attributes 222 specify the columns that

TABLE II

DATA REPOSITORY ABSTRACTION EXAMPLE (contd.)

```
025   <Field queryable="Yes" name="glucose trend at drug" displayable="Yes">
026      <AccessMethod foreignKey = "No" primaryKey = "No">
027         <Filtered>
028            <simple attrName = "glucosetrend" entityName="glucose trend data"/>
029            <Where>
030               <Condition field = "data://drug/began" operator="LE">
031                  <Value>
032                     <FieldRef name="data://lab tests/testdate" />
033                  </Value>
034               </Condition>
035               <Condition field="data://drug/stopped" operator="GE" relOperator="AND">
036                  <Value>
037                     <FieldRef name="data//lab tests/testdate" />
038                  </Value>
039               </Condition>
040            </Where>
041         </Filtered>
042      </Access Method>
043   </Field>
```

The results returned for this field are specified in line 28 wherein a simple access method is used to retrieve all of the "glucosetrend" aggregate data values from the abstract derived entity "glucose trend data." Note, the "glucosetrend" data is derived as an aggregate data value using the glucosetrend logical field $208_{11}$. Field specification $208_{10}$ includes a condition criterion corresponding to a filtered access method (lines 20-40) that constrains the data provided to the ADE "glucose trend data" to data points falling with the range specified by the filter expression "Drug began <Test date <Drug stopped." The filter restricts the rows to those where the test date falls within the time that a patient was taking the specified drug. Note that the filtering of rows is performed prior to building the abstract derived entity "glucose trend data." That is, the rows used to calculate the aggregate data values are determined before the aggregate data values are calculated. Changing the filter, therefore, will change the data used to calculate an aggregate value.

Lines 27-29 of field specification $208_{10}$ references the abstract derived entity "glucose trend data" illustrated in $208_{12}$. As described above, an abstract derived entity is a used appear in the derived table generated from the ADE definition $208_{12}$ and may be composed from fields appearing in the data repository abstraction component 148. Additionally, as described above, an access method that references an ADE may restrict the data values used to compose the ADE.

As illustrated, ADE specification $208_{12}$ includes two column attributes, "patient ID" and "glucose trend." Accordingly, the derived table generated from ADE specification $208_{12}$ includes two columns where each row specifies a patient (using the patient ID value) and a glucose trend value for that patient. The relations 224 specify how to join the columns together to compose the derived table. In this example, the relation joins on the "patient ID" column appearing in both the drug table 310 and lab tests table 330.

An illustrative abstract derived entity (ADE) based on ADE specification $208_{12}$ shown in FIG. 2C is shown in Table III below. By way of illustration, the abstract derived entity (ADE) is defined using XML. Other languages, however, may be used to advantage.

TABLE III

ABSTRACT DERIVED ENTITY EXAMPLE

```
000   <?xml version="1.0"?>
001      <Abstract_Derived_Entity entityName = "Glucose Trend Data">
002         <Attribute attrName = "patientID">
003            <AccessMethod foreignKey = "No" primaryKey = "No">
```

TABLE III-continued

ABSTRACT DERIVED ENTITY EXAMPLE

```
004                <Simple attrName = "patientID" entityName = "LABTESTS" />
005              </AccessMethod>
006            </Attribute>
007            <Attribute attrName = "glucosetrend">
008              <AccessMethod foreignKey = "No" primaryKey = "No">
009                <Aggregate>
010                  <Composition>
011                    REGR_SLOPE (
012                      <FieldRef name="data://Lab Tests/Glucose" />
013                      ,
014                      <FieldRef name="data://Lab Tests/Test Date" />
015                    )
016                  </Composition>
017                  <Groups>
018                    <Group>
019                      <FieldRef name="data://Lab Tests/Patient ID" />
020                    </Group>
021                  </Groups>
022                </Aggregate>
023              </AccessMethod>
024            </Attribute>
025            <Relations>
026              <Link id="  " source="demographics" sourcCardinality="one" sourceType="SQL"
027                                  target="drugs" targetCardinality="many"
028                                  targetType="SQL" type="LEFT">
029              <LinkPoint source="patientID" target="patientID">
030              <Link id="  " source="demographics" sourcCardinality="one"
031                                  sourceType="SQL" target="labtests" targetCardinality="many"
032                                  targetType="SQL" type="LEFT">
033              <LinkPoint source="patientID" target="patientID">
034              <Link id="  " source="demographics" sourcCardinality="one"
035                                  sourceType="SQL" target="gluclosetrenddata" targetCardinality="one"
036                                  targetType="SQL" type="LEFT">
037              <LinkPoint source="patientID" target="patientID">
038            </Relations>
039          </Abstract_Derived_Entity>
```

The two <attribute> elements appearing on lines 2-5 and 6-23, "patientID" and "glucosetrend," respectively, specify the columns included in the table. The first attribute references the patient ID column of lab tests table using a simple access method. The second attribute references the "glucose trend" field described above in conjunction with field specification $208_{10}$. The <Relations> elements on lines 25-39 specify that these two columns should be joined by matching the "patient ID" value from the lab tests table with the "patient ID" from the drugs table. The glucose trend attribute references an aggregate access method, and lines 10-16 specify the expression used to calculate the aggregate value (i.e., regression slope). The grouping element "patient ID" is listed in lines 17-21.

Operational Methods

Embodiments of the present invention allow the data repository abstraction component 148 to include fields that reference aggregate access methods and allow access methods to reference abstract derived entities. Methods of processing abstract queries that include these elements are now described.

Figure 6:
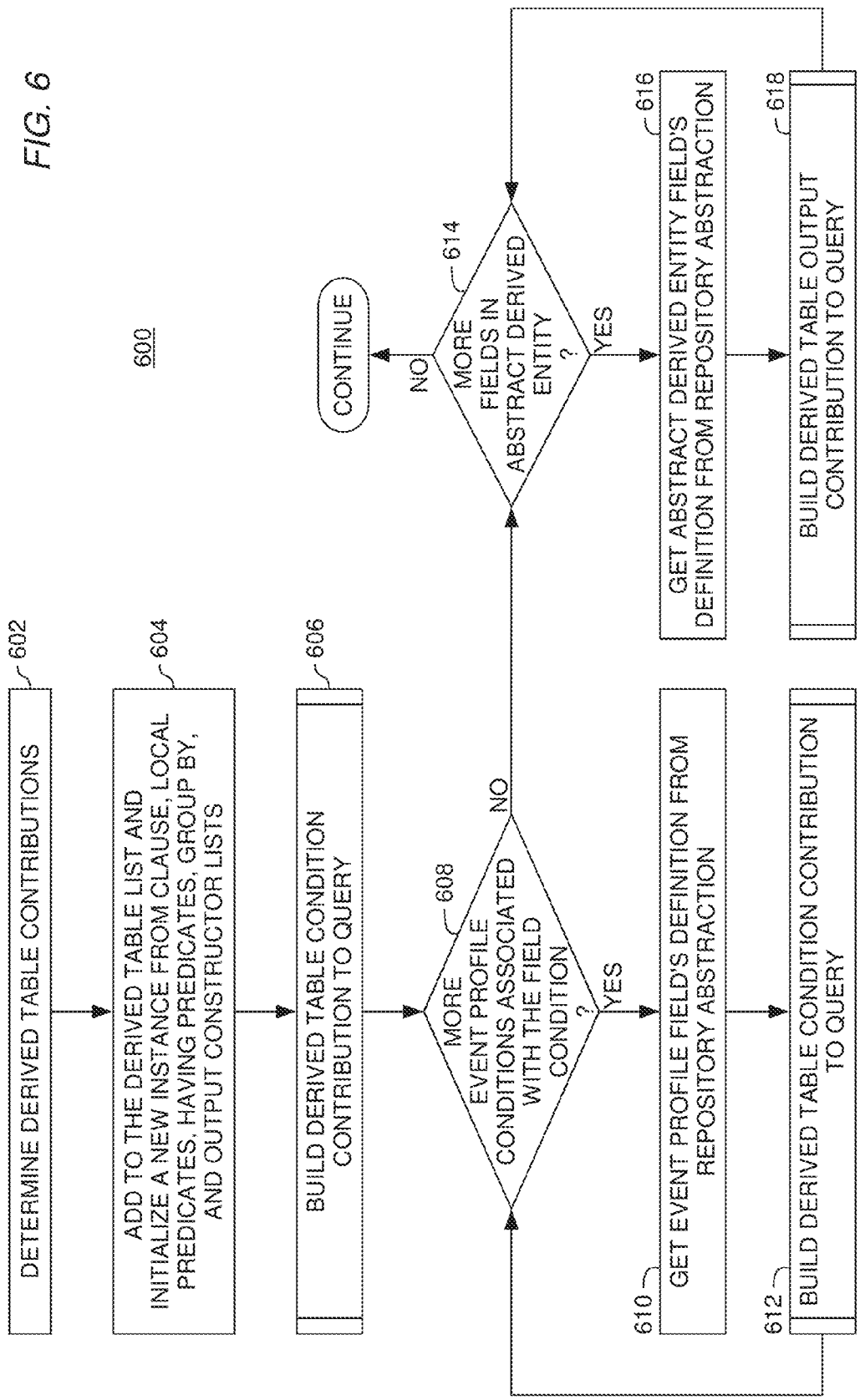

Using the example illustrated in FIG. 2C and FIG. 3, assume that a user wishes to build the abstract query $202_2$ illustrated in FIG. 6. One description of building such a query includes the following steps:

(i) creating an event profile that is applied to the drug field of the Drugs table 310 (from FIG. 3) and has a single condition of (Glucose Trend >0);

(ii) creating a selection criterion of Drug="MK-767" using the drugs field and apply the (Glucose Trend >0) event profile to the condition; and (iii) selecting the result fields of name, city, state and glucose trend.

After processing the completed abstract query, the runtime component 150 generates an SQL query such as:

select name, city, state glucose trend, from Demographics t1, ((select t2.patientid, regr_slope (days(testdate), glucose)) as "glucose Trend" from Lab Tests t2, Drugs t3 where t2.patientid=t3.patientid and began <testdate and stopped>testdate and drug='MK-767' group by t2.patientid having regr_slope(days,(testdate, glucose))>0) as t4 where t4.patientid=t1.patientid Using the methods described below in connection with FIGS. 4-8, embodiments of the present invention may be used to process abstract queries that include event profiles, abstract derived entities, and aggregate access methods into a physical query such as the one recited above.

Figure 4:
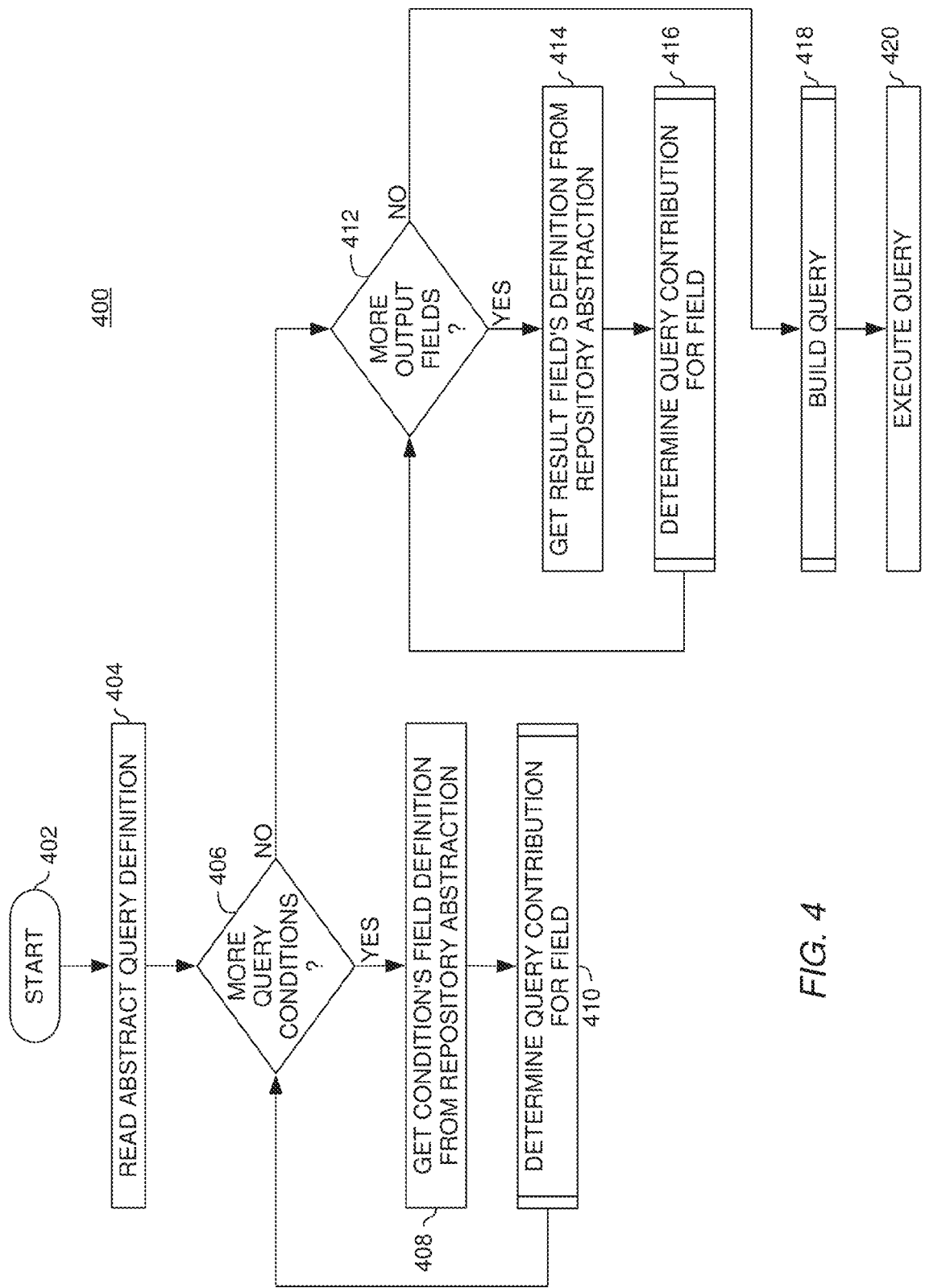
FIGS. 4-7 are flow charts illustrating the operation of a runtime component processing an abstract query, according to one embodiment of the invention.

FIG. 4 illustrates an exemplary runtime method 400 of one embodiment of the operation of runtime component 150. The method 400 begins at step 402 when the runtime component 150 receives as input an instance of an abstract query (such as the abstract query $202_2$ shown in FIG. 2C). At step 404, the runtime component 150 reads and parses the instance of the abstract query and locates individual selection criteria and desired result fields. At step 406, the runtime component 150 enters a loop (comprising steps 406, 408, and 410) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 150 uses the field name from a selection criterion of the abstract query to retrieve the definition of the field from the data repository abstraction component 148.

As noted above, the field specification 208 associated with a field being processed by runtime component 150 includes a definition of the access method used to access the physical data associated with the field. The runtime component 150 then determines (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve (or modify, add, etc.) data from a physical data repository, represented by the databases 156-157 shown in FIG. 1. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 400 enters a loop at step 412 (defined by steps 412, 416, and 418) to add result field definitions to the concrete query being generated. At step 414, the runtime component 150 looks up a result field name (from the result specification of the abstract query) in the data repository abstraction 148 and then retrieves a result field definition from the data repository abstraction 148 to identify the physical location of data to be returned for the current logical result field. The runtime component 150 then determines (as step 416) a query contribution of the query that identifies physical location of data to be returned for the logical result field.

At step 418, all of the subcomponents generated in steps 406, 408 and 410 and output fields generated in steps 412, 414, and 416 are assembled into one or more queries that the runtime component 150 executes against the underlying physical data sources. This process is further described below in reference to FIG. 8.

Figure 5:
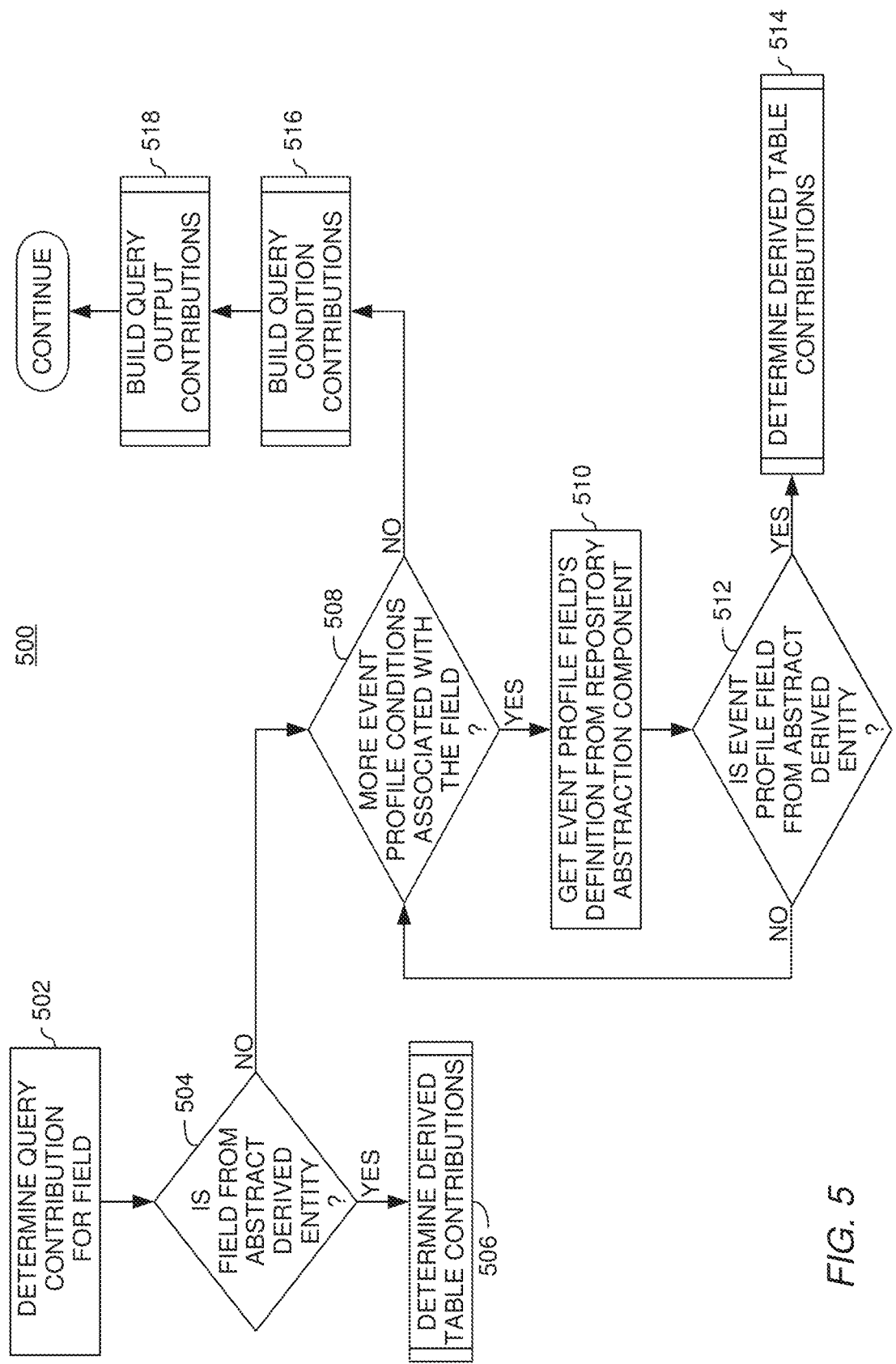

FIG. 5 illustrates one embodiment of a method 500 for determining a query contribution for a logical field included in steps 410 and 416 from method steps 400. Steps 410 and 416 of the method described in FIG. 4 each involve determining a query contribution for the selection criteria and result fields appearing in an abstract query. First, at steps 504 and 508 the runtime component 150 determines whether the field includes references to either an abstract derived entity or an event profile. If not, (i.e., the method follows the path 502→504→508→516) processing then continues at step 516 and 518 wherein the field is processed using the access method for each field defined in the data repository abstraction component 148. Otherwise, the field references an abstract derived entity, is restricted by an event profile, or both.

When the method 500 determines (at step 504) that the field is from an abstract derived entity, the runtime component 150 determines (at step 506), the derived table contributions for the field as described below in conjunction with FIG. 6. At step 508, (i.e., for fields that are not from an abstract derived entity), the method determines if an event profile condition needs to be applied to the field being processed. When an event profile appears in the logical field, then the runtime component 150 retrieves the definition corresponding to the event profile (step 510) from the data repository abstraction component 148. The runtime component 150 then determines whether the event profile definition retrieved in step 510 is itself from an abstract derived entity (at step 512). If so, the runtime component determines (at step 514) the derived table contributions for the event profile as described below in conjunction with FIG. 6. Steps 508 through 512 iterate for each event profile associated with the field being processed by the runtime component 150. That is, for each event profile, the runtime component 150 retrieves the event profile's field definition from the data repository abstraction 140 component and determines whether the field is from an abstract derived entity. For fields that are from an abstract derived entity, derived table contributions for the field are generated. After processing the event profile conditions (steps 508 and 510) and determining derived table contributions for any logical fields from abstract derived entities (steps (504 and 506) and (512 and 514)), processing continues in steps 516 and 518 wherein the runtime component 150 builds the selection contribution and results contribution for each field appearing in the abstract query.

FIG. 6 illustrates a method 600 for determining the derived table contributions for logical fields included in an abstract query that map to an abstract derived entity. In one embodiment, the method begins in step 604, by creating (or by adding to) a derived table list and initializing a new SQL query statement including a FROM clause, HAVING predicates and a GROUP BY clause, according to the definition of the abstract derived entity in the data repository abstraction component 148. The derived table list is a list of the derived tables and list of the subcomponents of the derived table including a FROM clause list, the local predicate list, the HAVING predicates, the GROUP BY, and an output constructor list. In the build query routine (illustrated in relation to FIG. 8), the list of derived table is used, first, to build the derived tables, and then to construct the complete query combining the derived tables with other parts of the query. Each derived table sub-query may be constructed according to the method illustrated in relation to FIG. 7. That is, for each derived table needed to complete query processing, a derived table sub-query may be independently generated and stored in the derived table list.

In step 606, the runtime component 150 builds the derived table condition contribution to the query for the fields included in the derived table. Similar to the conditions of abstract query $202_1$ described above regarding selection criteria for a logical field, each condition may consist of a field name (for a logical field), a comparison operator (=, >, <, etc) and a value expression (what is the field being compared to). At steps 608, 610, and 612 of method 600, the runtime component 150 process any event profile conditions associated with the derived table conditions. If there is an event profile applied to a field condition then at step 610, the runtime component 150 retrieves the definition for the field included in the event profile from the data repository abstraction component 148 and the event profile is applied to the condition field. In step 612, the runtime component 150 builds the derived table contributions for the field conditions as restricted by the event profile. Steps 608, 610, and 612 repeat until the all event profiles associated with the field being processed have been applied.

After processing the event profile conditions, the method moves to step 614 and translates each of the fields in the abstract derived entity by retrieving the field definition from the data repository abstraction component in step 614 and building the derived table output contribution to the query in 618. After all of the fields in the abstract derived entity have been retrieved and the derived table condition contributions and output contributions have been built, processing of the query continues at step 618.

Figure 7:
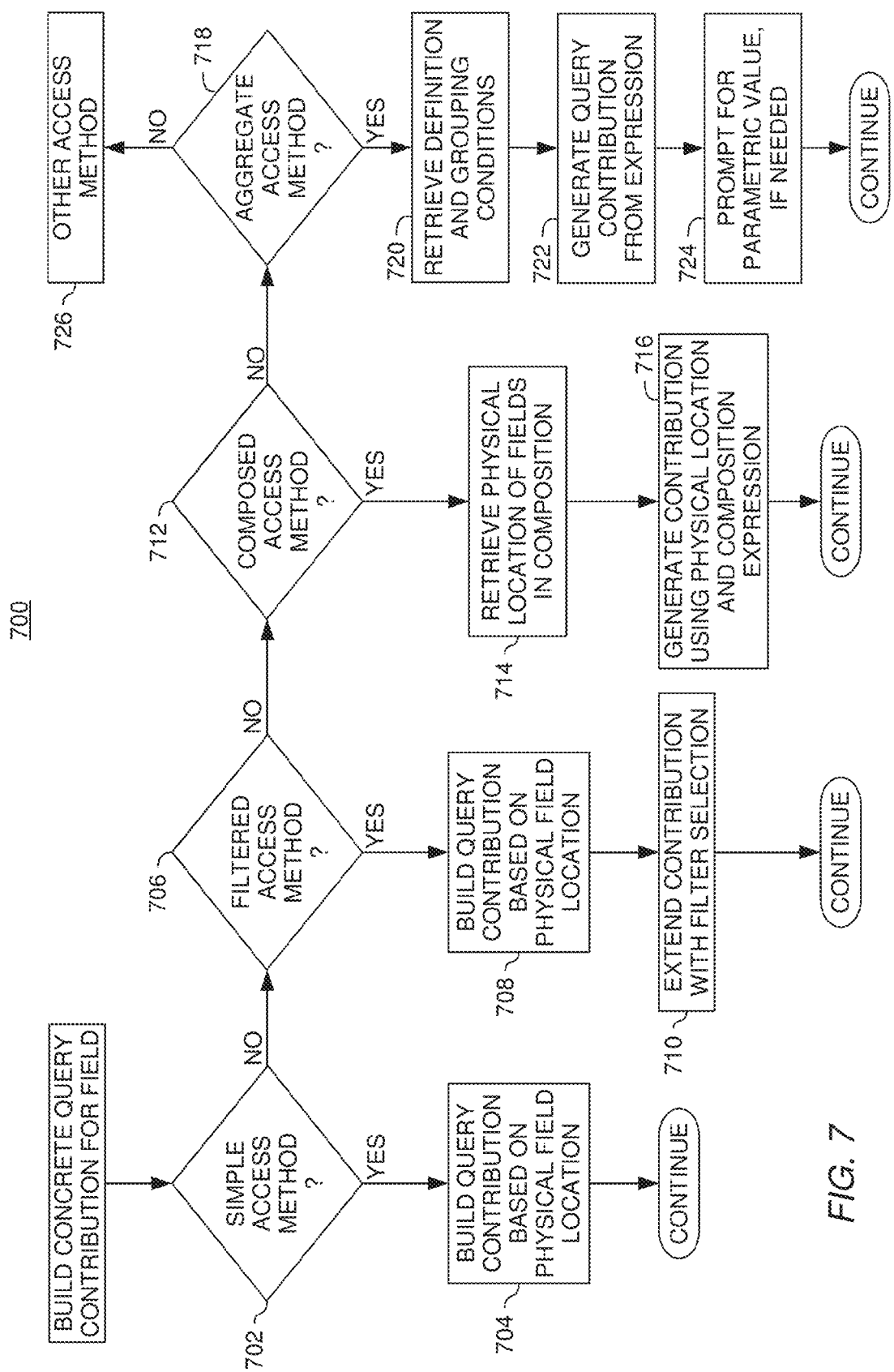

FIG. 7 illustrates one embodiment of a method 700 for building concrete query contributions for a logical field according to steps 516 and 518 from FIG. 5 and steps 612 and 618 from FIG. 6. At step 702, operations 700 determine whether the access method associated with the current logical field is a simple access method. If so, the concrete query contribution is built (step 704) based on physical data location information. Otherwise, processing continues to step 706 to query whether the access method associated with the current logical field is a filtered access method. If so, the concrete query contribution is built (step 708) based on physical data location information for some physical data entity. At step 710, the concrete query contribution is extended with additional logic (filter selection) used to filter the data retuned by the physical data entity.

If the access method is not a filtered access method, processing proceeds from step 706 to step 712 where the method 700 queries whether the access method is a composed access method. If the access method is a composed access method, the physical data location for each sub-field reference in the composed field expression is located and retrieved at step 714. At step 716, the physical field location information of the composed field expression is substituted for the logical field references of the composed field expression, whereby the concrete query contribution is generated.

If the access method is not a composed access method, processing proceeds to step 718 where the method 700 queries whether the access method is an aggregate access method. If the logical field being processed specifies an aggregate access method, then the expression used to generate the aggregate value is retrieved from the logical field speciation along with any grouping conditions at step 720. The expression specifies the data and an operation on the data used to calculate an aggregate value that is returned by the aggregate access method. As described above, the grouping conditions define how to segment the aggregate data into groups to calculate multiple aggregate values.

For example, using the values from the Lab Tests table shown in FIG. 3, with no grouping condition a logical field "average glucose" would return the aggregate value of "21.25" (the mathematical average of all the values in the glucose column) Alternatively, a grouping condition of "patient ID" would break the data used for aggregating into separate groups, one for each "Patient ID." This would change the results for the "average glucose" field to return two aggregate values, "15.5" for the "patient ID" of 4002, and "27" for the "patient ID" of 5001.

At step, 722 after retrieving the expression parameters, the runtime component 150 generates a query contribution for the aggregate access method. Optionally, if the logical field includes a parametric condition, at step 724, the entity that issued the abstract query is prompted to provide a value for the parametric condition. Parametric conditions are described in greater detail below.

If the access method is not an aggregate access method, processing proceeds from step 718 to step 726. Step 726 is representative of any other access methods types contemplated as embodiments of the present invention. It should be understood, however, that embodiments are contemplated in which less then all the available access methods are implemented. For example, in a particular embodiment only simple access methods are used. In another embodiment, only simple access methods and filtered access methods are used.

Figure 8:
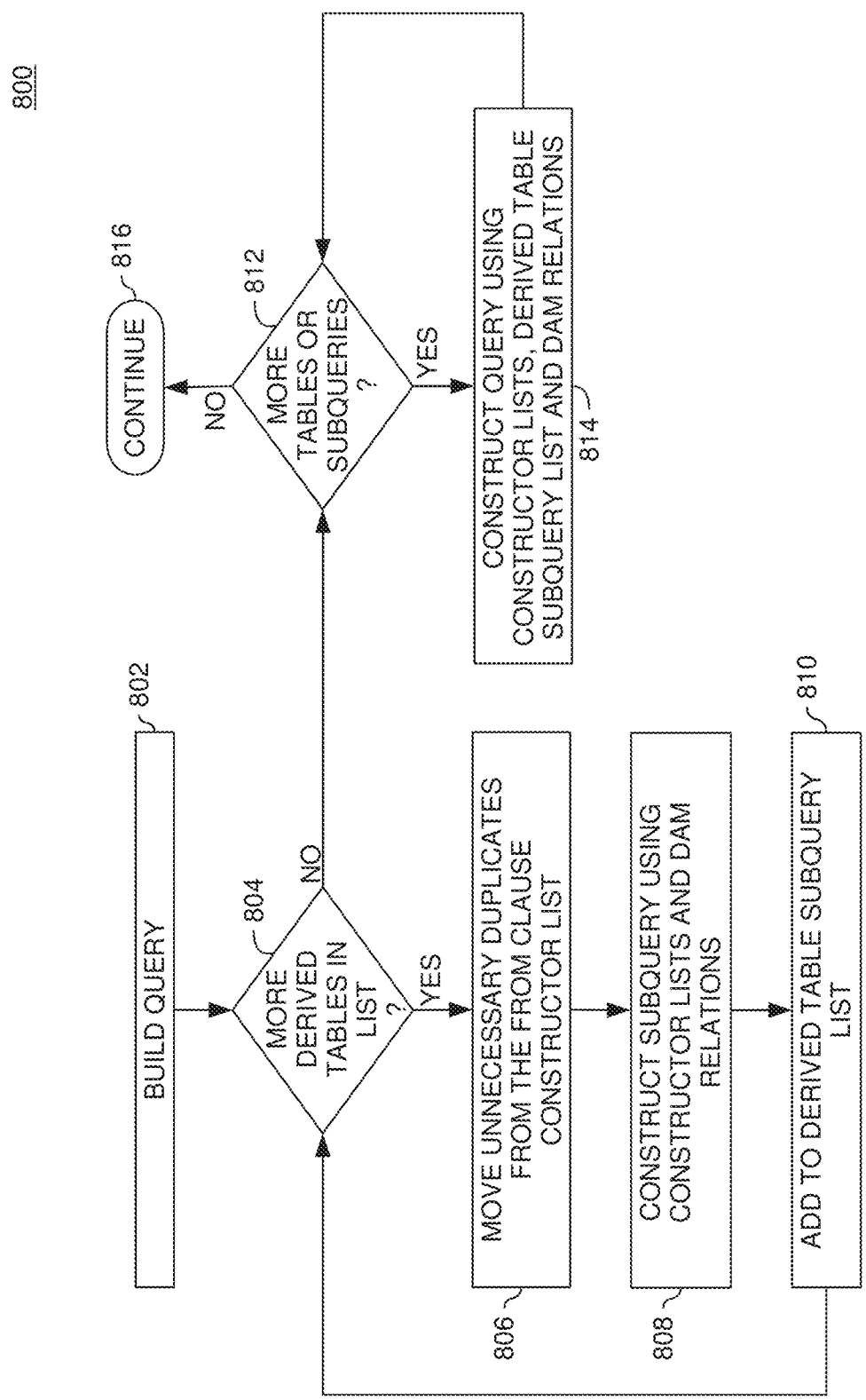
FIG. 8 a flow chart for building a concrete query from query contributions generated according to FIGS. 4-7, in one embodiment of the invention.

Once all the query contributions from the logical fields appearing in the abstract query have been processed, the completed query may be assembled. Retuning to the operations 400 of FIG. 4, the completed query is built and executed in steps 418 and 420, respectively. FIG. 8 illustrates an embodiment of a method to build the completed concrete query from the query contributions generated according to the methods illustrated by FIGS. 4-7. In one embodiment, operations 800 begin in step 804 where the method determines whether any abstract derived tables appear in the abstract derived table list generated during step 604 of FIG. 6, according to steps 506 and 514 of FIG. 5. In step 806, the completed query is optimized by removing any duplicate query contributions that occur due to the discrete processing of each abstract derived entity and logical field. At step 808, a sub-query is constructed using the query contributions generated while processing the abstract derived entity fields according to operations 600. It is this step where the derived table (or a query representation of the table) is generated.

In step 810, the derived table is added to the table sub-query list. Operations 800 continue iterating through steps 804, 806, 808, and 810 and generate a derived table sub-query for each abstract derived table. For example, the sub-query portion of the SQL query recited above includes the following sub-query for the "glucose trend data" abstract derived entity:

((select t2.patientid, regr_slope (days(testdate), glucose)) as "glucose Trend" from Lab Tests t2, Drugs t3 where t2.patientid=t3.patientid and ((began <testdate) and (stopped >testdate)) and drug='MK-767' group by t2.patientid having regr_slope (days,(testdate, glucose))>0).

As recited, this sub-query includes the event profile "(glucose trend >0)" and the filter of field specification $208_{10}$ as part of the sub-query. The filter expression dictates the data supplied to the "glucose trend data" ADE, and the event profile ("glucose trend >0)" applied to the "drug='MK-767' condition. In step 812, a completed query is constructed from each derived table sub-query and other query contributions. The sub-query components are merged with the query contributions generated from steps 516 and 518 of FIG. 5, according to the operations of FIG. 7, into the completed query. Once the completed query is merged from all the query contributions, the runtime component 150 may execute the query against the underlying physical data sources 156-157 and transmit query results to the user.

Parametric Conditions on Abstract Derived Entities

For some embodiments of the invention, an abstract derived entity may be used as a template for a series of abstract derived entities. ADE templates are completed via the use of parametric conditions that filter the set of data contained in the derived table when it is created at query execution time.

Parametric conditions are added to the definition of the abstract derived entity. Each parametric condition indicates that the rows for the abstract derived entity should be restricted to those associated with a specified state or property. When a user submits an abstract query for execution, the runtime 150 component may inspect the logical fields to identify whether it includes any abstract derived entities that include parametric conditions. If found, then the system prompts the user to specify one or more state values according to the conditions appearing in the definition of the ADE The state values may be used to filter the data generated for the derived entity. Doing so allows the same abstract derived entity definition to be reused for a variety of data subsets. Illustrative examples of parametric conditions may filter by age, gender, location, dates, but any logical condition may be used to advantage. Illustratively, adding to the XML provided in Table III, parametric conditions might be defined as follows.

TABLE III

ABSTRACT DERIVED ENTITY EXAMPLE (contd.)

029 <Condition field="data://demographics/state" operator="EQ"?>
030   <value parm="YES"/>
031 </Condition>
032 <Condition> field="data://demographics/gender" operator="EQ">
033   <Value parm="YES/>
034 </Condition>

Lines 29-34 add two parametric conditions to the "glucose trend data" abstract derived entity. Specifically, these lines add "state" and "gender" parametric conditions to the ADE. When an ADE specification includes condition elements, a user is prompted to select a value condition prior to generating the derived table.

In one embodiment, a user may compose abstract queries by interacting with a graphical user interface (GUI). FIG. 9 illustrates an exemplary GUI screen 900 displayed to a user engaged in building an abstract query that includes an abstract derived entity template. GUI screen 900 includes a query composition area 902 used to compose an abstract query from the available fields in the data repository abstraction component 148. As illustrated, the editing area displays the abstract query $202_2$ from FIG. 2C.

Below the editing area 902 is a current query summary area 904 that displays the currently composed query executed by using the "Execute Search" button 912. When a user does so, the runtime component 150 may cause the dialog box show in FIG. 10 to be displayed to the user. As illustrated, FIG. 10 shows a dialog box with radio buttons allowing a user to select the gender restriction and a drop down box to select a U.S. State restriction applied to the results generated for the query. Note that these conditions are applied to exclude rows that would otherwise appear in the derived table (an output restriction). Compare this result with the aggregate access method event profile "(glucose trend >0)" wherein the rows included in the aggregate calculation are limited to those that have the contemporaneous condition specified by the event profile (an input restriction).

Extending the access methods available to a data repository abstraction component to include aggregate access methods enables logical fields that return aggregate data calculated from the columns of an underlying relational data source or other groupings of data. An expression included in a field specification of an aggregate access method expresses how to compose the aggregate values from the underlying data elements. Further, aggregate values may be combined with an abstract derived entity to create a derived table composed of aggregate values joined with other non-aggregate data. Combining aggregate access methods with an abstract derived entity allows a user to construct complex queries to uncover attributes of the underlying data, such as trends that occur over time. Parametric conditions may also be applied to an abstract derived entity to limit a particular query to a dynamically specified sub-set of data.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
providing a data abstraction layer comprising a set of logical fields used to compose an abstract query, each logical field providing an access method specifying how to access a respective physical data source, wherein the physical data source specified for at least one access method comprises an abstract derived entity specifying to aggregate physical data in one or more physical databases, the abstract derived entity comprising a data object stored in the data abstraction layer and that is referenced by other data objects in the data abstraction layer as though the abstract derived entity is a relational table stored in the one or more physical databases, wherein the at least one logical field is defined based on a markup language and via a field entry having an access method entry and at least one of a field name entry, a queryable entry, and a displayable entry;
receiving, from a requesting entity, an abstract query specifying at least one logical field that provides an access method referencing the abstract derived entity, and not specifying any physical fields of the one or more physical databases, wherein a definition is retrieved for the abstract derived entity referenced by the at least one logical field; and
generating, by operation of one or more computer processors and when the abstract query is converted to a concrete query, a derived table sub-query that queries a derived relational table defined by the abstract derived entity and stored in the one or more physical databases and not in the abstraction layer, wherein the derived relational table is generated by aggregating values stored in a column of a first database table, joining the aggregated values with non-aggregated values stored in a column of a second database table, and filtering based on a parametric condition that facilitates the abstract derived entity serving as a template for a set of distinct abstract derived entities, each corresponding to a distinct value of the parametric condition, wherein the columns of the first and second database tables are identified in the abstract derived entity, wherein the concrete query specifies to join the derived relational table with at least one non-derived relational table in the one or more physical databases and does not specify any logical fields of the data abstraction layer, whereby the data abstraction layer supports aggregating physical data without requiring any view aggregating the physical data to be created or maintained in the one or more physical databases.

2. The method of claim 1, wherein each entry is selected from an attribute and a child element, wherein the field entry, the access method entry, the field name entry, the queryable entry, and the displayable entry comprise a field element, an access method child-element, a field name attribute, a queryable attribute, and a displayable attribute, respectively, wherein the access method child-element has a filtered child-element, wherein the filtered child-element has a simple child-element, wherein the simple child-element has an attribute name attribute, an entity name attribute, and a WHERE clause child-element, wherein the WHERE clause child-element has a plurality of distinct condition child-elements, each condition child-element having a field attribute, an operator attribute, and a value child-element, the value child-element having a field reference child-element, the field reference child-element having a reference name attribute, wherein the method further comprises:

transforming each logical field included in the abstract query that does not reference the abstract derived entity into a query contribution consistent with the physical data source specified by the access method provided for the respective logical field, wherein the derived table sub-query is merged with the query contributions, wherein the merged query is issued against the physical data sources and the derived relational table to generate query results, wherein the query results are returned to the requesting entity.

3. The method of claim 2, wherein the abstract derived entity defines: (i) sets of data elements comprising, in respective instances, other abstract derived entities different from the abstract derived entity, data stored in physical data sources, and data retrieved using other logical fields appearing in the data abstraction layer; and (ii) a composition rule defining how to combine the sets of data elements into the derived relational table, wherein each set of data elements comprises a column of the derived relational table, whereby the data abstraction layer supports a plurality of distinct, user-specified aggregations, each characterized by a distinct set of rows included in the respective aggregation, without requiring any database administrator to first create, in the one or more physical databases, a static view corresponding to any of the plurality of distinct, user-specified aggregations.

4. The method of claim 3, wherein the access method specified by the at least one logical field that references the abstract derived entity comprises, in respective instances, a simple access method, a filtered access method, and a composed access method, wherein in a given instance, the sets of data elements comprise the other abstract derived entities, the data stored in the physical data sources, and the data retrieved using the other logical fields appearing in the data abstraction layer.

5. The method of claim 4, wherein the at least one logical field referencing the abstract derived entity includes a filtered access method to specify the data included in the sets of data according to condition criteria specified by a filtering expression appearing in the at least one logical field, wherein the derived relational table is generated by:
  filtering the values stored in the column of the first database table prior to aggregation and based on an aggregation condition;
  aggregating only the filtered values, wherein at least one value filtered out by the aggregation condition is not aggregated;
  joining the aggregated values with the non-aggregated values stored in the column of the second database table; and
  filtering the joined values based on the parametric condition, wherein the parametric condition is different from the aggregation condition, whereby filtering occurs both prior to and subsequent to aggregation and based on respective conditions.

6. The method of claim 5, wherein the abstract query further comprises at least one logical field that includes a condition criterion and at least one event profile condition, wherein the condition criterion specifies a logical operation included in the query contribution for the logical field that constrains the query result data included in query results and wherein the event profile condition is applied to the condition criterion of the logical field to restrict the query result data to those query result data for which the condition criterion and the event profile condition are contemporaneously true;
  wherein the abstract derived entity is defined via the markup language, wherein the abstract derived entity is defined via an abstract derived entity element having an entity name attribute, an attribute child-element, and a relations child-element, wherein the attribute child-element has an attribute name attribute and an access method child-element.

7. The method of claim 6, wherein the abstract derived entity defines at least one set of data elements using a logical field that references an aggregate access method that specifies a set of input data and an expression, wherein the expression defines an operation for determining at least an aggregate data value from the set of input data;
  wherein the access method child-element has, in a first instance, a foreign key attribute, a primary key attribute, and a simple type child-element, wherein the simple type child-element has an attribute name attribute and an entity name attribute, wherein the access method child-element has, in a second instance, an aggregate child-element.

8. The method of claim 7, wherein the set of input data comprises a column of data from relational a physical data source, and wherein the aggregate access method specifies a grouping condition used to divide the column of data into groups of input data used to calculate multiple aggregate data values according to the expression specified by the aggregate access method;
  wherein the aggregate child-element has a composition child-element and a groups child-element, wherein the groups child-element has a group child-element, wherein the group child-element has a field reference child-element, wherein the field reference child-element has a reference name attribute, wherein the relations child-element has a link child-element and a link point child-element.

9. The method of claim 8, wherein the abstract derived entity further defines the parametric condition, which is applied to the query results returned to the requesting entity, wherein the parametric condition is defined via the markup language, wherein the parametric condition is defined via a condition element having a field attribute, an operator attribute, and a value child-element, the value child-element having a parameter attribute, wherein the abstract derived entity further defines a second parametric condition different from the parametric condition.

10. The method of claim 9, further comprising:
  upon determining that the abstract query includes a logical field providing an access method referencing an abstract derived entity that includes a parametric condition, prompting the requesting entity for a value used to apply the parametric condition to the query results;
  wherein the requesting entity is not prompted for any value used to apply the parametric condition to the query results, upon determining that the abstract query does not include any logical field providing an access method referencing an abstract derived entity that includes a parametric condition.

11. The method of claim 10, wherein prompting the requesting entity for a value used to apply the parametric condition to the query results comprises:
  presenting a user interacting with a computer connected to a network with one or more graphical user interface screens used to obtain the value;
  wherein the link child-element has an identifier attribute, a source attribute, a source cardinality attribute, a source type attribute, a target attribute, a target cardinality attribute, a target type attribute, and a link type attribute, wherein the link point child-element has a source attribute and a target attribute, wherein the markup language comprises Extensible Markup Language (XML).

12. A system comprising:
a processor;
an abstract data layer, configured to provide a set of logical fields used to compose abstract queries; wherein each logical field (i) specifies an access method that specifies how to access a respective data source, and (ii) wherein an access method for at least one logical field specifies an abstract derived entity specifying to aggregate physical data in one or more physical databases and defining a derived relational table as the data source associated with the at least one logical field, the abstract derived entity comprising a data object stored in the abstract data layer and that is referenced by other data objects in the abstract data layer as though the abstract derived entity is a relational table stored in the one or more physical databases, wherein the derived relational table is stored in the one or more physical databases and not in the abstract data layer, wherein the at least one logical field is defined based on a markup language and via a field entry having an access method entry and at least one of a field name entry, a queryable entry, and a displayable entry; and
a runtime component, executed by the processor, configured to receive an abstract query specifying at least one logical field that provides an access method referencing the abstract derived entity, and not specifying any physical fields of the one or more physical databases, and further configured to, in response, (i) to generate a query contribution for each logical field included in the abstract query, (ii) to compose a derived relational table sub-query for the at least one logical field that specifies an abstract derived entity, (iii) to merge the query contributions and derived table sub-query into a combined query executable by a database management system, and (iv) to issue the combined query to the database management system, to generate a set of query results data; wherein the derived relational table sub-query queries the derived relational table defined by the abstract derived entity, wherein the derived relational table is generated when the abstract query is converted to a concrete query, and by aggregating values stored in a column of a first database table, joining the aggregated values with non-aggregated values stored in a column of a second database table, and filtering based on a parametric condition that facilitates the abstract derived entity serving as a template for a set of distinct abstract derived entities, each corresponding to a distinct value of the parametric condition, wherein the concrete query specifies to join the derived relational table with at least one non-derived relational table in the one or more physical databases and does not specify any logical fields of the abstract data layer, whereby the abstract data layer supports aggregating physical data without requiring any view aggregating the physical data to be created or maintained in the one or more physical databases.

13. The system of claim 12, wherein the data object defines (i) sets of data elements selected from at least one of, other abstract derived entities, data stored in a database management system, and logical fields appearing in the abstract data layer, and (ii) a composition rule that describes how to combine the sets of data elements into a relational table wherein each set of data elements comprises a column of the relational table.

14. The system of claim 13, wherein the abstract derived entity includes at least one logical field used to define a set of data elements that specifies an aggregate access method, wherein the aggregate access method defines a set of input data and an expression for calculating an aggregate value from the set of input data.

15. The system of claim 14, wherein the set of input data comprises a column of a relational table stored by the database management system.

16. A non-transitory computer-readable medium containing a program which, when executed, performs an operation comprising:
receiving, from a requesting entity, an abstract query composed from a set of logical fields and not specifying any physical fields of one or more physical databases, wherein each logical field specifies at least an access method for accessing data corresponding to the logical field, wherein the access method for at least one logical field accesses data from an abstract derived entity specifying to aggregate physical data in the one or more physical databases, the abstract derived entity comprising a data object stored in a data abstraction layer for the one or more physical databases, the data object referenced by other data objects in the data abstraction layer as though the abstract derived entity is a relational table stored in the one or more physical databases, wherein the at least one logical field is defined based on a markup language and via a field entry having an access method entry and at least one of a field name entry, a queryable entry, and a displayable entry, wherein a definition describing a derived relational table is retrieved for the abstract derived entity referenced by the at least one logical field;
generating, by operation of one or more computer processors when executing the program and when the abstract query is converted to a concrete query, a derived table sub-query corresponding to the derived relational table described by the abstract derived entity wherein logical fields included in the abstract query are transformed into a query contribution consistent with the access method specifying a data source for the logical field, wherein the derived table sub-query is merged with the query contributions; and
issuing the merged query against the physical data sources and the derived relational table to generate query results, wherein the derived relational table is generated in response to receiving the abstract query and by aggregating values stored in a column of a first database table, joining the aggregated values with non-aggregated values stored in a column of a second database table, and filtering based on a parametric condition that facilitates the abstract derived entity serving as a template for a set of distinct abstract derived entities, each corresponding to a distinct value of the parametric condition, wherein the concrete query specifies to join the derived relational table with at least one non-derived relational table in the one or more physical databases and does not specify any logical fields of the data abstraction layer, wherein the query results are returned to the requesting entity, whereby the data abstraction layer supports aggregating physical data without requiring any view aggregating the physical data to be created or maintained in the one or more physical databases.

17. The non-transitory computer-readable medium of claim 16, wherein the abstract derived entity defines sets of data elements comprising at least one of (i) other abstract derived entities different from the abstract derived entity, (ii)

data stored in physical data sources, and (iii) data retrieved using other logical fields appearing in the data abstraction layer.

18. The non-transitory computer-readable medium of claim 17, wherein the abstract derived entity further defines a composition rule specifying how to combine the sets of data elements into the derived relational table.

19. The non-transitory computer-readable medium of claim 18, wherein each set of data elements comprises a column of the derived relational table, whereby the data abstraction layer supports a plurality of distinct, user-specified aggregations, each characterized by a distinct set of rows included in the respective aggregation, without requiring any database administrator to first create, in the one or more physical databases, a static view corresponding to any of the plurality of distinct, user-specified aggregations.

20. The non-transitory computer-readable medium of claim 19, wherein the sets of data elements comprise the other abstract derived entities, the data stored in the physical data sources, and the data retrieved using the other logical fields appearing in the data abstraction layer.

* * * * *